US007391319B1

(12) United States Patent
Walker

(10) Patent No.: US 7,391,319 B1
(45) Date of Patent: Jun. 24, 2008

(54) WIRELESS FIRE ALARM DOOR UNLOCKING INTERFACE

(76) Inventor: Ethan A. Walker, 126 W. Main St., Norman, OK (US) 73069

( * ) Notice: Subject to any disclaimer, the term of this patent is extended or adjusted under 35 U.S.C. 154(b) by 320 days.

(21) Appl. No.: 11/208,817

(22) Filed: Aug. 22, 2005

(51) Int. Cl.
*G08B 1/08* (2006.01)
*G08B 13/00* (2006.01)
*G05B 19/00* (2006.01)

(52) U.S. Cl. ........................ 340/536; 340/531; 340/542; 340/5.31; 340/286.05; 340/539.17; 340/539.14; 70/263

(58) Field of Classification Search ................. 340/536; 349/536
See application file for complete search history.

(56) References Cited

U.S. PATENT DOCUMENTS 5,070,442 A * 12/1991 Syron-Townson et al. ..... 700/17
5,541,586 A * 7/1996 Wise .......................... 340/2.2
5,903,216 A * 5/1999 Sutsos et al. ................ 340/542
5,979,754 A * 11/1999 Martin et al. ............... 235/382
6,720,861 B1 4/2004 Rodenbeck et al.
2003/0006879 A1* 1/2003 Kang et al. ................ 340/5.61
2007/0013476 A1* 1/2007 Petrovic ..................... 340/5.7

* cited by examiner

*Primary Examiner*—Donnie L. Crosland
(74) *Attorney, Agent, or Firm*—Doerner Saunders Daniel & Anderson, LLP; James F. Harvey, III

(57) ABSTRACT

A wireless fire alarm door unlocking system includes a remote alarm panel interface to receive information from a central alarm panel interface over an RF channel. The central alarm panel interface monitors an output from an alarm control panel and, when an alarm condition is asserted, initiates an unlock signal that is sent to the remote alarm panel interface. It in turn causes the door with which it is associated to unconditionally release to allow unimpeded entrance and exit. The system also monitors the status of the remove alarm panel interface and raises an alert in the event of a malfunction. The interface may be implemented as a hardware and software modification to an access control system or as separate components that coexist with an access control system on a non-interfering basis.

20 Claims, 3 Drawing Sheets

WIRELESS FIRE ALARM DOOR UNLOCKING INTERFACE

BACKGROUND OF THE INVENTION

The present invention relates to a wireless security access control system that grants or denies access to a user seeking access to a facility. More specifically, the present invention relates to an apparatus and a method of unlocking electrically secured doors controlled by a wireless security access control system in the event of an activation of an alarm condition.

Modern day commercial facilities are required by building codes to have alarm control systems to detect hazardous events and to warn the inhabitants of the facility of the occurrence of a dangerous condition. Such systems generally consist of a collection of sensors that detect the hazardous condition, an alarm control panel that serves as a central coordination and distribution point; and a collection of alarm devices that provide sensory warnings to the facility occupants. Such hazardous conditions may include, but not be limited to, fires, toxic fumes, carbon monoxide, radiation, and toxic chemical releases. For example, in a typical fire alarm control system, a collection of smoke and/or heat detectors may be installed at strategic locations throughout the facility to detect a fire. These are connected to a fire alarm control panel (FACP). A number of alarms such as lights, horns, sirens, and the like are also installed at strategic locations, so that when a sensor detects the presence of fire, it triggers the appropriate alarm device(s) through the FACP. Such triggers are generally provided as outputs from the FACP that actuate an alarm device. In addition, such alarm control systems are hardwired to release devices on the doors to automatically release the doors in the event that they are secured at the time of the hazardous condition.

Some modern day commercial facilities may also have access control systems installed to provide positive control of entrance and exits, i.e. doors, using electrically actuated locks. These locks permit controlled access to areas by requiring the person who desires entrance to present an access means that is recognized by the access control system, whereupon the lock will release and allow the person to enter. Such access means may include the presentation of a coded personnel access device, such as a magnetically or digitally encoded card or tag, or the manual entry of a numeric code on a keypad located adjacent to the door. When the access means is presented to the access control system at the door, a door controller or computer validates the access means and temporarily unlocks the door if the access means is valid.

A system described in U.S. Pat. No. 6,720,861 to Rodenbeck et al., discloses a system that uses wireless means to communicate between system components. In this system, a centrally located computer communicates with a remote access controller located at each door for which controlled access is desired. The computer communicates by means of a remote wireless communicator, receives requests from the remote access controllers, validates the code presented by the person desiring access, and provides access information to the remote access controller allowing it to open the door. The remote wireless communicator communicates via radio frequency (RF) media, and preferably by spread-spectrum RF. However, this arrangement does not address other wireless means for allowing the remote access controller to operate, such as activation by a fire or other catastrophic event.

Many municipal building codes require an automatic unlock at all exit doors when the building fire alarm system is activated. Typically, a hardwired alarm system is installed in public buildings such as theaters, restaurants, etc., to handle this, along with possibly a sprinkler system. If such an alarm control panel is already in place within a facility and a hardwired access control system is to be installed, then installation of the hardwired access control system is relatively easy since the cables can generally be piggy-backed with the existing cable runs for the alarm control panel and both hardwired systems may be wired to actuate the same door unlocking mechanism. However, the installation of additional cabling for the access control system involves higher labor costs and costs for the wiring.

If a wireless access control system is to be installed, then an opportunity is presented to dispense with the cabling of the alarm control system and take advantage of the wireless access control system for performing all communication with the door unlocking mechanism. The wireless access control system generally interfaces with the alarm control panel by providing an input at each door to which the wire from the alarm control panel may be connected. This input is intended to bypass the access control system and to directly open the electronic lock associated with the door, without any direct interaction with the access control system. However, this method still requires the installation of an alarm control system with wiring to each of the doors. Furthermore, if there is any failure of the alarm control system circuitry or associated devices, there is no indication of the failure that would allow remedial action to be taken.

As can be seen, there is a need for a wireless door unlocking interface that can be integrated with an access control system and configured to present alarm control panels to provide the capability of unlocking electronically secured doors in the event of an emergency. The door unlocking interface should also be wireless to eliminate the need for expensive cabling and to provide for ease in installation. The door unlocking interface should also have a self-test capability that would notify maintenance personnel of malfunctions to ensure that the equipment is operating properly in case of an emergency.

SUMMARY OF THE INVENTION

In one aspect of the present invention, a wireless door unlocking interface is provided for a facility having sensors connected to an alarm control panel, the facility further having an access control system comprising a central access controller and a remote access controller, with the remote access controller positively controlling access to the facility through an electronic lock on a door. The door unlocking interface comprises a central alarm control panel interface receiving an alarm signal from the alarm control panel and responsively generating an unlock signal; a first RF transceiver transmitting the unlock signal on a channel of an RF communications link; a second RF transceiver receiving the unlock signal; and a remote alarm control panel interface associated with the door, the remote alarm control panel interface receiving the unlock signal from the second RF transceiver and responsively disengaging the electronic lock to cause the release of the door.

In another aspect of the present invention, an integrated system is provided for controlling access to a facility through a door and for unlocking the door in response to an alert condition. The integrated system comprises an alarm control panel providing an alarm signal; a central access controller containing a central alarm control panel interface, the central alarm control panel interface receiving the alarm signal and responsively sending an unlock signal; a central alarm transceiver transmitting the unlock signal over a wireless communications channel; a remote alarm transceiver receiving the unlock signal on the wireless communications channel and providing the unlock signal to a remote alarm control panel interface; and a remote access controller containing the remote alarm control panel interface, the remote access controller associated with the door, the remote alarm control panel interface receiving the unlock signal and responsively disengaging a lock associated with the door to cause the release of the door.

These and other aspects, objects, features and advantages of the present invention, are specifically set forth in, or will become apparent from, the following detailed description of a preferred embodiment of the invention when read in conjunction with the accompanying drawings.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

This invention provides a wireless means for releasing electric door locks in the event of an alarm caused by a catastrophic event such as a fire, tornado warning, chemical spill, toxic gas, and the like. The invention may be used in any facility that has an access control system that provides controlled access to the interior of the facility and also has an alarm control system that provides a warning of hazardous conditions that would necessitate an immediate release of all controlled doors. The invention may find application in commercial facilities such as businesses, theaters, secure installations, prisons, and other similar buildings.

The invention allows existing hardwired alarm control systems to take advantage of the wireless communications channel provided by a wireless access control system that may be installed thereafter. Use of the invention allow older, hardwired connections to be replaced with a wireless communications channel or, alternatively, to allow the wireless communications channel of an access control system to also serve the needs of the alarm control system in addition to its access functions. The invention may also provide a backup power system that is independent of power systems in existing or new access control systems. The invention may also provide an interface between an alarm control panel and an access control system, where the alarm control panel coordinates sensors and alarm annunciation devices within a facility, by allowing the access control system to directly respond to alarms generated by the alarm control system. In addition, the inventive interface may provide a self-test capability by periodically transmitting test signals to verify the integrity and proper functioning of the system. If the power to any of the components of the system fails, if a low battery condition occurs, or if the wireless communications link becomes inoperative, then these events will be reported to maintenance personnel by inventive device so that corrective steps may be taken.

Figure 1A:
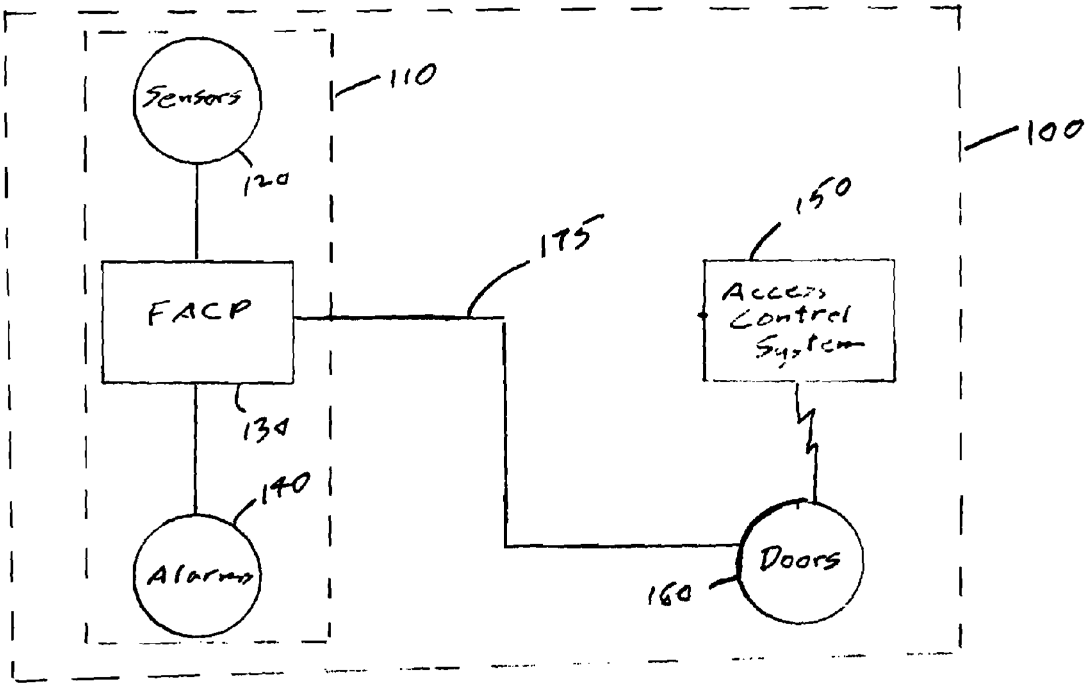
FIG 1A (Prior Art)
FIG. 1A shows a block diagram of the prior art where an alarm control panel and an access control system are present in the same facility.

Referring now to FIG. 1A, a prior art block diagram is shown. According to the prior art, a facility 100 may have a fire alarm control system 110 comprising a set of sensors 120, a fire alarm control panel (FACP) 130, and a set of alarm annunciating devices 140. One example of a panel currently in use is the Silent Knight™, manufactured by Silent Knight Security Systems of Minnesota, Inc., South Bloomington, Minn., and Honeywell International Inc., Morristown, N.J. The same facility 100 may also have an access control system 150 that controls the doors 160 used to enter and leave the facility 100. Modern access control systems 150 may communicate with each of the door 160 by means of either hardwired connections or by RF communications, and each door 160 may have its own remote access controller as part of the access control system 150. However, present configurations of the FACP 130 communicate with the doors via a set of hardwired connections 175. The remote access controller located at each door 160 may have a special input that is tied with the hardwire connection 175 from the FACP 130 to the door; this special input may unconditionally unlock the door 160 when it is triggered, thus bypassing the controllers in the access control system. The existing hardwire connection 175 installed in the facility 100 from the FACP 130 to each door 160 may be utilized.

Figure 1B:
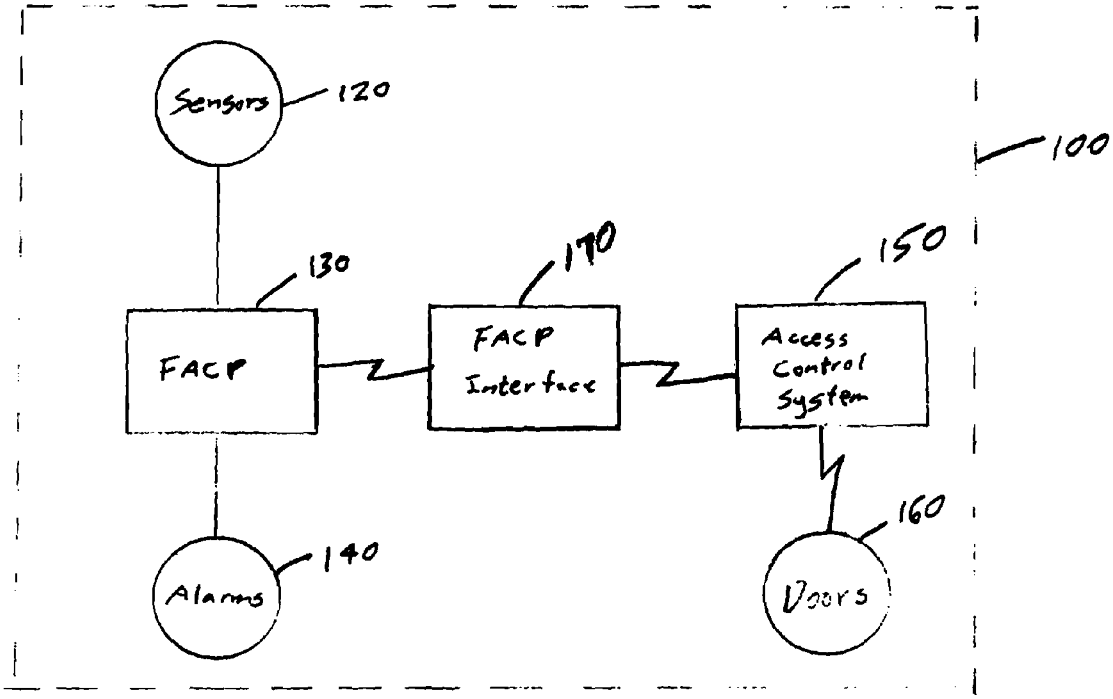
FIG. 1B shows a block diagram how the invention interacts with an alarm control panel and the access control system present in a facility.

Referring now to FIG. 1B, the invention provides a FACP interface 170 that may allow the alarm signal from the FACP 130 to be provided to the suitable interfaces 170 associated with each door 160 over a wireless communications link that is used by the access control system 150 to communicate with the doors 160. The hardwired connection 175 between the FACP 130 and the doors 160 may be replaced by the wireless communications link so that hardwired connections 175 are no longer necessary. In different embodiments of the invention, the particular wireless communication channel may either be a separate channel dedicated for use with the FACP 130 or the same wireless communications channel used by the access control system 150.

Figure 2:
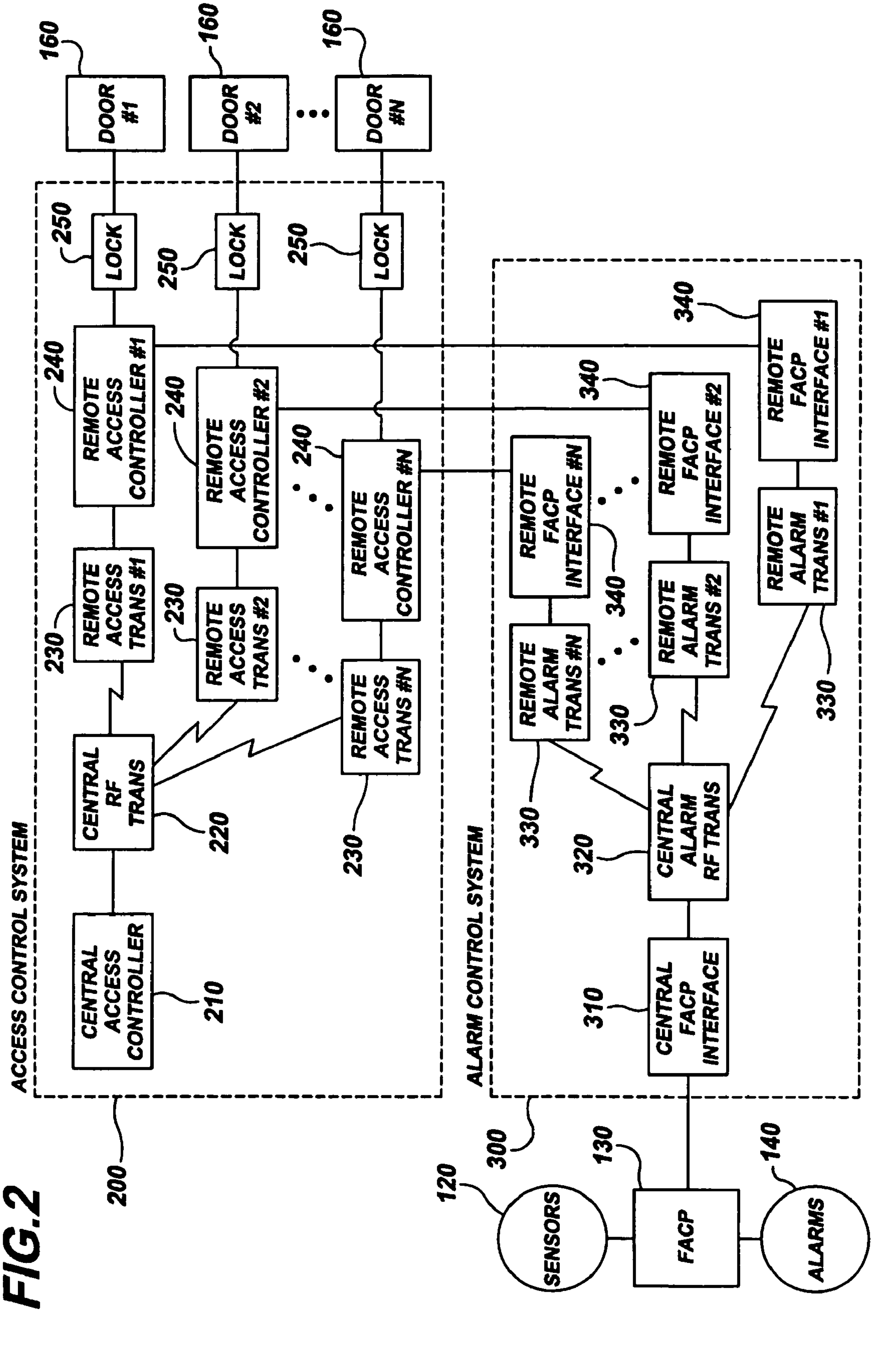
FIG. 2 shows a block diagram of an embodiment of the inventive system.

Referring now to FIG. 2, a block diagram of a wireless fire alarm control panel interface is shown according an embodiment of the invention, in which an access control system 200 and an alarm control system 300 are installed within a facility having a fire alarm control panel (FACP) 130. Although this embodiment may be described with relation to a fire alarm control panel for illustrative purpose, it should be understood that the embodiment may be used with other alarm panels configured for other hazards without departing from the scope of the invention. For example, the interface may operate as an interface for toxic gases alarm control panels, radiation alarm control panels, chemical spill alarm control panels, etc.

The FACP 130 may be connected with one or more alarm annunciating devices 140 within the facility. It may receive signals from sensors 120 located within the facility to detect the occurrence of a hazardous condition, such as a fire, and take actions to warn personnel of the hazardous condition, i.e. bells, sirens, flashing lights, and fire department notifications. These sensors 120 may generally be hardwired to the FACP 130; although any method of interfacing the sensors 120 to the FACP 130 could be used without departing from the scope of the invention.

The facility may have installed an access control system 200 and an alarm control system 300. Each system 200, 300 may be provided with components dedicated to that system. The alarm control system 300 may include a central FACP interface 310 (or, generically, a central alarm control panel interface) and a remote FACP interface 340 (or, generically, a remote alarm control panel interface) that is physically located at each door 160 of the facility. The access control system 200 may include a central access controller 210 with a remote access controller 240 physically located at each door 160 of the facility. In addition, the remote access controller 240 may control an electronic lock 250 associated with each door 160, which enables the access control system 200 to positively control the opening of each door 160.

Each system 200, 300 may use a channel of an RF communications link for exchange of messages pertinent to the respective system. The central FACP interface 310 may be provided with a central alarm RF transceiver 320 that may communicate via its channel with remote alarm transceivers 330 positioned in the vicinity of each door 160. Similarly the central access controller 210 may be provided with a central RF transceiver 220 that may communicate via its channel with remote access transceivers 230 positioned in the vicinity of each door 160. The RF channel used by the alarm control system 300 may be the same RF channel used by the access control system or a different RF channel, depending upon the communications protocol chosen to communicate information between the respective systems. Messages sent and received within the access control system 200 should not interfere with messages sent and received within the alarm control system 300, and the communications protocol should be chosen with this as a consideration.

According to the embodiment of FIG. 2, the alarm control system 200 may provide control through selective use of an unlock signal, a restore signal, a query signal, an acknowledge signal, and a heartbeat signal. Each of these signals will be described presently. For purposes of this disclosure, the term "signal" may be used as a functional term to describe an action that may have significance or meaning for a sender and a receiver, according to a predetermined arrangement. Thus an electrical signal having a given voltage, amplitude, or similar quantifiable attribute may, when present, be interpreted by the receiver as a command to unlock a door, for example. A digital message containing an identifier may be a signal as well, so that when the message is decoded and its data interpreted, the receiver may be commanded to perform an action or receive information.

The alarm control system 300 may implement an unlock signal to cause the lock 250 of a door 160 within the facility to disengage and allow unimpeded access. When the FACP 130 receives a signal from a sensor 120 indicating that a hazardous condition is present, the FACP 130 may send an alarm signal to the central FACP interface 310. The central FACP interface 310 may responsively generate an unlock signal for transmission by the central alarm RF transceiver 320 to the remote alarm transceivers 330. Each remote alarm transceiver 330 may receive the unlock signal and provide it to the remote FACP interface 340 for processing. The remote FACP interface 340 may responsively cause the lock 250 to disengage and release the door 160. This may be accomplished in one of two methods. The first method may be used with access control systems 200 that are configured to recognize a particular physical override signal. When an appropriately formatted signal is provided as the physical override signal, then it will bypass any control circuitry within the remote access controller 240 and unconditionally allow the lock 250 to disengage. The second method may be used with access control systems 200 that lack such an override capability. In this case, a dry contact relay may be provided to receive an appropriately formatted signal from the remote FACP interface 340 and to remove power from a power supply (not shown) providing power for the remote access controller 240 and the lock 250 associated with the door 160, thus causing the lock to disengage.

The alarm control system 300 may also implement a restore signal to cause the lock 250 of a door 160 within the facility to engage and restore its access control function. This may be accomplished according to two different methods. According to a first method, the central FACP interface 310 may be provided with the capability of automatically detecting when the alarm signal from the FACP 130 is no longer present, at which time it may initiate a restore signal that is sent to the remote FACP interfaces 340. According to a second method, the central FACP interface 310 may be provided with the function of detecting when a manual switch is set within the FACP 130, which would require human intervention. The manual signal may direct the central FACP interface 310 to send the restore signal to the remote FACP interfaces 340. Regardless of which method is used, the remote FACP interface 340 may either remove the physical override signal from the remote access controller 240 or reset the dry contact relay that dropped power to the remote access controller 240, depending upon which method is used. Optionally, the capability of generating a restore signal may be omitted from implementation within the alarm control system 300 and manual resets may be used.

The alarm control system 300 may also implement an error detection capability that may use a query signal, an acknowledge signal, a heartbeat signal, or some combination thereof, which may involve periodically sending query signals from the central FACP interface 310 and the remote FACP interfaces 340 to determine the proper functioning of the remote components. Circumstances that may be interpreted as errors may include the loss of power to a remote component, a malfunction of the remote component, or a loss of communications between the central FACP interface 310 and the remote FACP interface 340.

This error detection capability may be implemented in several different ways. In one embodiment, each remote FACP interface 340 may be assigned a unique identifier, and the central FACP interface 310 may periodically initiate a query signal that is broadcast to all remote FACP interfaces 340 simultaneously. Each remote FACP interface 340 may then respond with an acknowledge signal containing an indication of the identity of the remote FACP interface 340 that is sending the acknowledge signal. If the central FACP interface 310 fails to receive an acknowledge signal from a particular remote FACP interface 340 within a fixed duration of time, then it may initiate an error alert condition calling attention to the particular remote FACP interface 340 so that maintenance personnel can investigate. The central FACP interface 310 may maintain a timer associated with each remote FACP interface 340, such that the timer may be set for the fixed duration of time when the query signal is sent; if the timer is a countdown timer, then the error alert condition would be asserted when the timer reached zero.

In another embodiment, the central FACP interface 310 may sequentially poll each remote FACP interface 340 in turn by sending a query signal containing an identifier for the particular remote FACP interface 340 being queried and waiting a specified period of time for a response. Each remote FACP interface 340 may receive the query signal, determine whether or not it must respond to the query signal, and, if it was being queried, return an acknowledge signal containing its unique identifier. If the remote FACP interface 340 identified by the query signal does not respond within the fixed duration of time, then the central FACP interface 310 may initiate an error alert condition calling attention to the particular remote FACP interface 340 so that maintenance personnel can investigate.

In still another embodiment, each remote FACP interface 340 may periodically send a heartbeat signal with an identifier in round-robin or random fashion, indicating that the particular remote FACP interface 340 is properly functioning. The central FACP interface 310 may maintain a timer for each remote FACP interface 340 which it may reset to a fixed duration of time when it receives a heartbeat signal from the remote FACP interface 340. If the timer times out for a particular remote FACP interface 340, then the central FACP interface 310 may again initiate an error alert condition calling attention to the particular remote FACP interface 340 so that maintenance personnel can investigate. As a variation of this embodiment, the central FACP interface 310 may periodically broadcast a heartbeat signal to all remote FACP interfaces 340, indicating that the central FACP interface 310 is properly functioning. Each remote FACP interface 340 may maintain a timer for the central FACP interface 310 which it may reset to a fixed duration of time when it receives a heartbeat signal from the central FACP interface 310. If the timer times out for the central FACP interface 310, then each remote FACP interface 340 may initiate the error alert condition. As still another variation of this embodiment, both the central FACP interface 310 and each remote FACP interface 340 may send heartbeat signals back and forth as previously described.

In each case, the error alert condition may cause the generation of an audible or visual alarm, the presentation of the identifier of the failed remote device on a display, the initiation of an automated call to a predetermined telephone number, or some combination of these actions.

Figure 3:
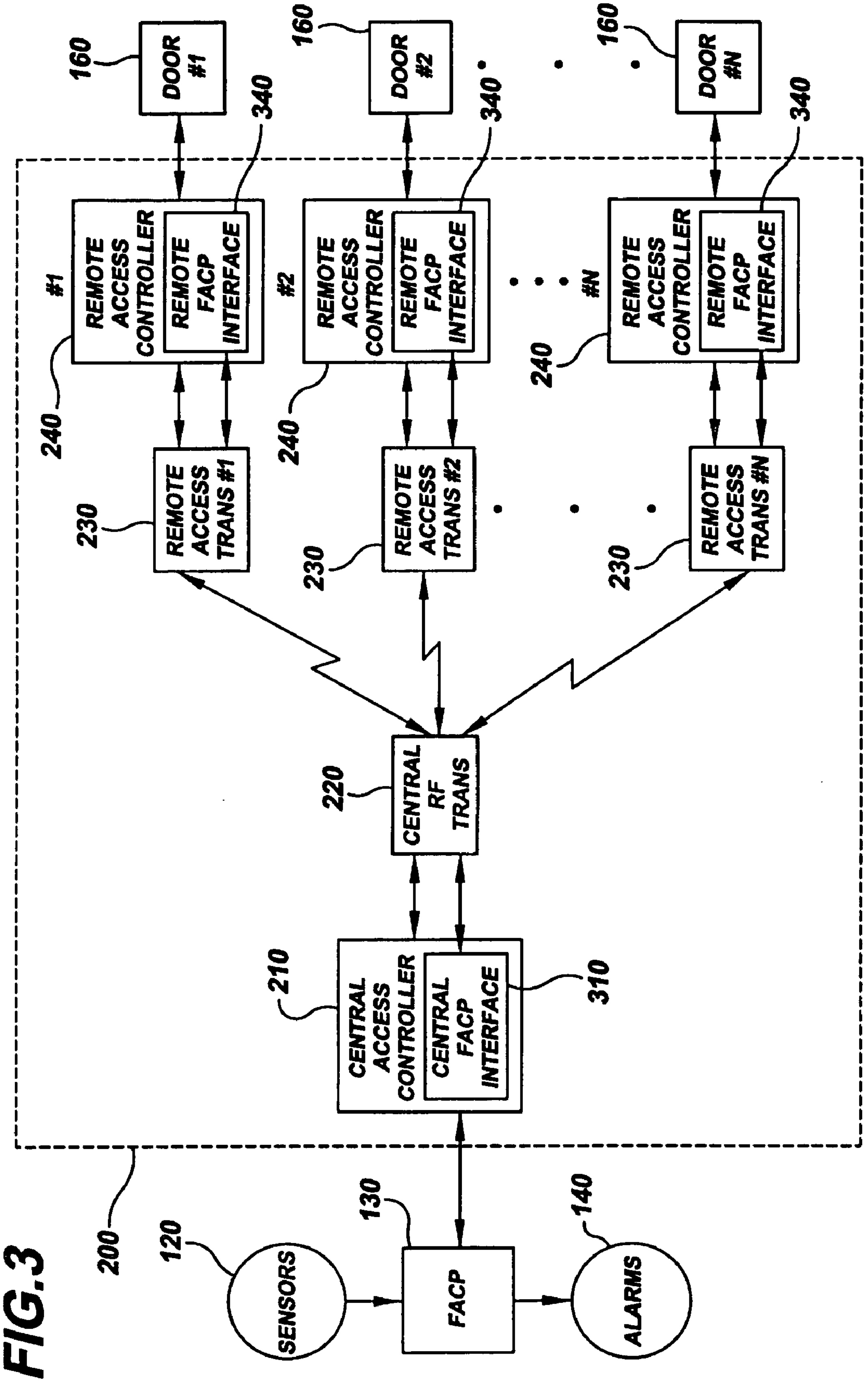
FIG. 3 shows a block diagram of another embodiment of the inventive system.

Referring now to FIG. 3, a block diagram of a wireless fire alarm control panel interface is shown according to another embodiment of the invention, in which the FACP interface may be integrated into two portions of the access control system 200, i.e. a central FACP interface 310 integrated within the central access controller 210 and a remote FACP interface 340 integrated within each remote access controller 240. The central FACP interface 310 may provide a means for receiving an alarm signal from the FACP 130 and initiating an unlock signal to be sent to all remote access controllers 240 that may be associated with entry/exit points within a facility, where the unlock signal may be processed by the resident remote FACP interface 340. It should be again noted that although the current embodiment is described in terms of a fire alarm system, the invention may be used in conjunction with any such alarm system, such as tornado warnings, nuclear spills, water damage, and the like, without departing from the scope of the invention.

The central FACP interface 310 and remote FACP interface 340 may be integrated into the access control system 200 in the form of software, firmware, hardware, or any combination thereof. It may provide an interface with the FACP 130 to receive alarm signals and to provide control through selective use of an unlock signal, a restore signal, a query signal, an acknowledge signal, and a heartbeat signal, as disclosed previously According to FIG. 3, the central access controller 210 may be provided to control access to a facility by interacting with one or more remote access controllers 240 located at each entry and exit door 160 for the facility. Communications between the central access controller 210 and the remote access controllers 240 may be accomplished through a channel on a wireless communications link, such as a RF channel, for sending and receiving messages. The central access controller 210 may interact with a central RF transceiver 220 to communicate via the RF channel to one or more remote transceivers 230 for purposes of identifying personnel desiring entry, identifying the person, authentication of the person's identity, and unlocking the door 160. These functions may vary according to the nature and configuration of the access control system.

The central FACP interface 310 may be provided as an integrated component of the central access controller 210. The functions of the central FACP interface 310 may be to provide an interface with the FACP 130, determine the presence of an alarm signal, and initiate an unlock signal to the remote access controllers 240 to unconditionally unlock the doors 160 when the alarm signal is detected. The signal may be broadcast from the central RF transceiver 220 via the RF channel to the remote RF transceivers 230 for processing. A remote FACP interface 340 may be provided as an integrated component of the remote access controller 240. The functions of the remote FACP 340 may be to recognize the signal and to provide a command to unconditionally unlock the door 160. By providing a central FACP interface 310 and remote FACP interfaces 340, the alarm control system may use the same RF channel that is used by the access control system 200, resulting in improved utilization of the system's components.

As can be seen, the invention provides for a unique system and method for interfacing a fire alarm control panel with an access control system within a facility, where both use wireless communication means. It should be understood, of course, that the foregoing relates to exemplary embodiments of the invention and that modifications may be made without departing from the spirit and scope of the invention as set forth in the claims that will be appended to this description in due course.

I claim:

1. A door unlocking interface for a facility having sensors connected to an alarm control panel, the facility further having an access control system comprising a central access controller and a remote access controller, the remote access controller positively controlling access to the facility through an electronic lock on a door, the door unlocking interface comprising:

a central alarm control panel interface receiving an alarm signal from the alarm control panel and responsively generating an unlock signal;

a first RF transceiver transmitting the unlock signal on a channel of an RF communications link;

a second RF transceiver receiving the unlock signal;

a remote alarm control panel interface associated with the door, the remote alarm control panel interface receiving the unlock signal from the second RF transceiver and responsively disengaging the electronic lock to cause the release of the door; and an error detection function for detection of errors on the channel.

2. The door unlocking interface described in claim 1, wherein the remote access controller recognizes an override signal, and wherein the remote alarm control panel interface provides an override signal to the remote access controller in response to an unlock signal.

3. The door unlocking interface described in claim 1, further comprising a dry contact relay disposed to remove power from the electronic lock, wherein the remote alarm control panel interface activates the dry contact relay in response to the unlock signal.

4. The door unlocking interface described in claim 1, further comprising a third RF transceiver;

a fourth RF transceiver, wherein the third RF transceiver and the fourth RF transceiver transmit signals between the central access controller and the remote access controller.

5. The door unlocking interface of claim 1, further comprising a restore signal transmitted by the central alarm control panel interface to the remote alarm control panel interface;

wherein the remote alarm control panel interface responsively engages the lock on the door.

6. The door unlocking interface of claim 5, further comprising a restore signal transmitted by the central alarm control panel interface to the remote alarm control panel interface, the restore signal transmitted when the alarm signal is no longer present.

7. The door unlocking interface of claim 5, further comprising a restore signal transmitted by the central alarm control panel interface to the remote alarm control panel interface transmitted when a manual reset signal is received by the central alarm control panel, the manual reset signal sent by the alarm control panel in response to a manual switch.

8. The door unlocking interface of claim 1, wherein the error detection function comprises a query signal with an identifier associated with the remote alarm control panel interface, the query signal is periodically transmitted by the central alarm control panel interface to the remote alarm control panel interface; and an acknowledge signal sent by the remote alarm control panel interface to the central alarm control panel interface in response to the query signal containing the identifier associated with the remote alarm control panel interface, the acknowledge signal containing the identifier;

wherein the central alarm control panel interface waits for the acknowledge signal containing the identifier and issues an error alert condition if the acknowledge signal containing the identifier is not received within a fixed duration of time.

9. The door unlocking interface of claim 1, wherein the error detection function comprises a heartbeat signal periodically sent by the remote alarm control panel interface to the central alarm control panel interface, the heartbeat signal containing an identifier uniquely associated with the remote alarm control panel interface;

wherein the central alarm control panel interface maintains a timer having a fixed duration of time and issues an error alert condition if the heartbeat signal containing the identifier is not received within the fixed duration of time.

10. The door unlocking interface of claim 1, wherein the error detection function comprises a heartbeat signal periodically sent by the central alarm control panel interface to the remote alarm control panel interface;

wherein the remote alarm control panel interface maintains a timer having a fixed duration of time and issues an error alert condition if the heartbeat signal is not received within the fixed duration of time.

11. An integrated system for controlling access to a facility through a door and for unlocking the door in response to an alert condition, the integrated system comprising an alarm control panel providing an alarm signal;

a central access controller containing a central alarm control panel interface, the central alarm control panel interface receiving the alarm signal and responsively sending an unlock signal;

a central alarm transceiver transmitting the unlock signal over a wireless communications channel;

a remote alarm transceiver receiving the unlock signal on the wireless communications channel and providing the unlock signal to a remote alarm control panel interface;

a remote access controller containing the remote alarm control panel interface, the remote access controller associated with the door, the remote alarm control panel interface receiving the unlock signal and responsively disengaging a lock associated with the door to cause the release of the door; and an error detection function for detection of errors on the channel.

12. The integrated system described in claim 11, wherein the wireless communications channel is an RF communications channel.

13. The integrated system described in claim 11, further comprising a restore signal transmitted by the central alarm control panel interface to the remote alarm control panel interface;

wherein the remote alarm control panel interface responsively engages the lock on the door.

14. The integrated system described in claim 13, further comprising a restore signal transmitted by the central alarm control panel interface to the remote alarm control panel interface, the restore signal transmitted when the alarm signal is no longer present.

15. The integrated system described in claim 13, further comprising a restore signal transmitted by the central alarm control panel interface to the remote alarm control panel interface transmitted when a manual reset signal is received by the central alarm control panel, the manual reset signal sent by the alarm control panel in response to a manual switch.

16. The integrated system described in claim 11, wherein the error detection function comprises a query signal with an identifier associated with the remote alarm control panel interface, the query signal periodically transmitted by the central alarm control panel interface to the remote alarm control panel interface; and an acknowledge signal sent by the remote alarm control panel interface to the central alarm control panel interface in response to the query signal containing the identifier associated with the remote alarm control panel interface, the acknowledge signal containing the identifier;

wherein the central alarm control panel interface waits for the acknowledge signal containing the identifier and issues an error alert condition if the acknowledge signal containing the identifier is not received within a fixed duration of time.

17. The integrated system described in claim 11, wherein the error detection function comprises a heartbeat signal periodically sent by the remote alarm control panel interface to the central alarm control panel interface, the heartbeat signal containing an identifier uniquely associated with the remote alarm control panel interface;

wherein the central alarm control panel interface maintains a timer having a fixed duration of time and issues an error alert condition if the heartbeat signal containing the identifier is not received within the fixed duration of time.

18. The integrated system described in claim 11, wherein the error detection function comprises a heartbeat signal periodically sent by the central alarm control panel interface to the remote alarm control panel interface;

wherein the remote alarm control panel interface maintains a timer having a fixed duration of time and issues an error alert condition if the heartbeat signal is not received within the fixed duration of time.

19. In a facility having an access control system and a fire alarm control system, the access control system comprising a central access controller, a remote access controller, and an RF channel, the central access controller communicating with the remote access controller over the RF channel, the remote access controller positively controlling access to the facility through an electronic lock on a door, the fire alarm control system comprising a sensor connected to a fire alarm control panel that generates an alarm signal in response to the sensor, an alarm control system comprising a central alarm control panel interface receiving the alarm signal from the fire alarm control system and responsively generating an unlock signal that causes the door to disengage.

20. The door unlocking interface described in claim 19, comprising a first RF transceiver transmitting the unlock signal on the channel;

a second RF transceiver receiving the unlock signal; and a remote alarm control panel interface associated with the door, the remote alarm control panel interface receiving the unlock signal from the second RF transceiver and responsively causing the electronic lock to disengage and release the door.

* * * * *